J. TESSIER.
MOTION PICTURE MECHANISM.
APPLICATION FILED APR. 30, 1913.

1,087,996.

Patented Feb. 24, 1914.

2 SHEETS—SHEET 1.

WITNESSES:
Jos. G. Denny
Geo. N. Kinney

INVENTOR
Julien Tessier,
BY Charles N. Butler
ATTORNEY.

J. TESSIER.
MOTION PICTURE MECHANISM.
APPLICATION FILED APR. 30, 1913.
1,087,996.
Patented Feb. 24, 1914.
2 SHEETS—SHEET 2.
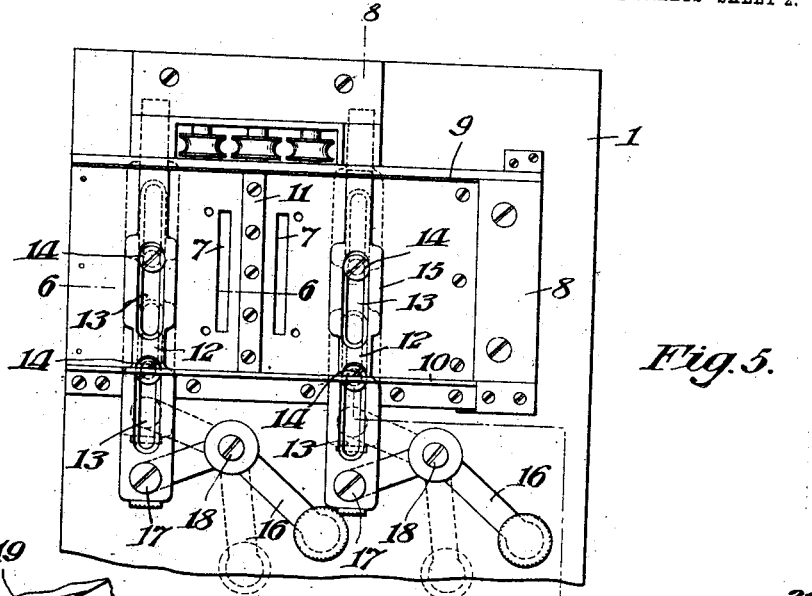
Fig. 5.
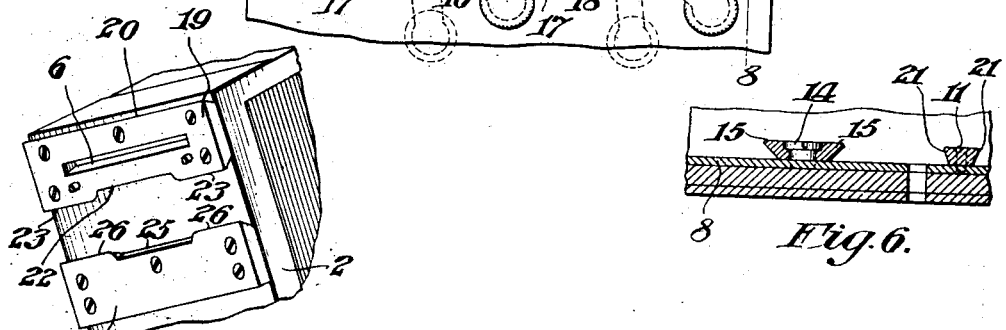
Fig. 6.
Fig. 7.
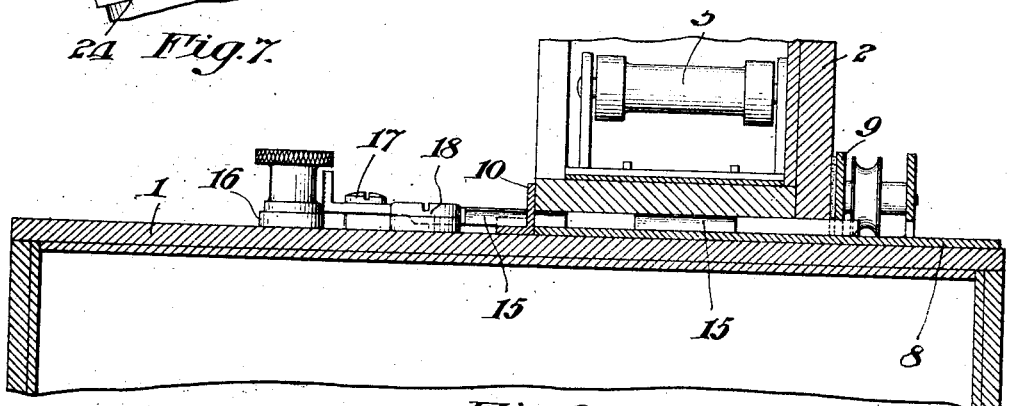
Fig. 8.
WITNESSES:
INVENTOR
Julien Tessier,
BY
Charles N. Butler
ATTORNEY.

UNITED STATES PATENT OFFICE.

JULIEN TESSIER, OF PHILADELPHIA, PENNSYLVANIA, ASSIGNOR TO LUBIN MANUFACTURING COMPANY, OF PHILADELPHIA, PENNSYLVANIA, A CORPORATION OF PENNSYLVANIA.

MOTION-PICTURE MECHANISM.

1,087,996.     Specification of Letters Patent.     Patented Feb. 24, 1914.

Application filed April 30, 1913. Serial No. 764,503.

*To all whom it may concern:*

Be it known that I, JULIEN TESSIER, a citizen of the Republic of France, residing in the city of Philadelphia, county of Philadelphia, and State of Pennsylvania, have invented certain Improvements in Motion-Picture Mechanism, of which the following is a specification.

My invention relates more particularly to improvements in film magazines for motion picture cameras and projecting machines.

My leading object is to provide improved means for connecting and disconnecting the magazines with the camera or projecting machine, and, by the same operation, opening and closing the passages through which the films are drawn, attaining the desiderata of providing efficient means for attaching and detaching the magazines while automatically preventing the admission of light through the film passages of the magazines when they are detached and opening such film passages by the operation of effecting the attachment.

The characteristic features of my improvements are fully disclosed in the following description and the accompanying drawings in illustration thereof.

Figure 1:
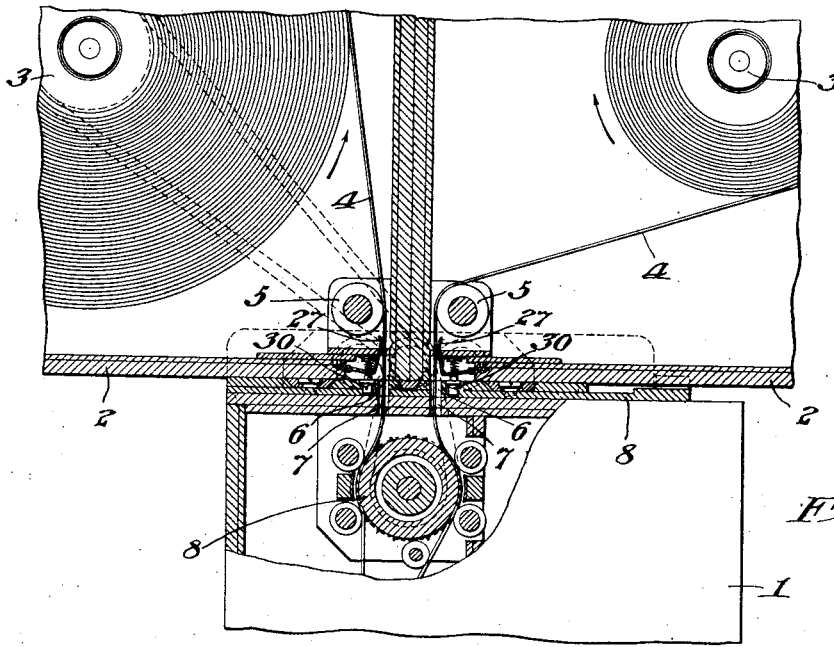
Figure 2:
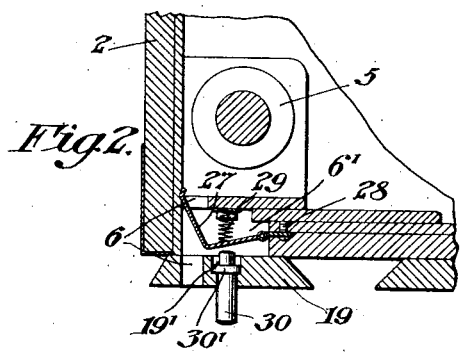
Figure 3:
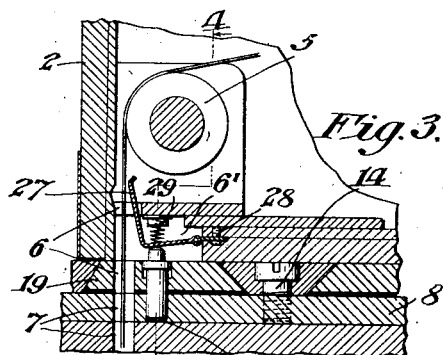
Figure 4:
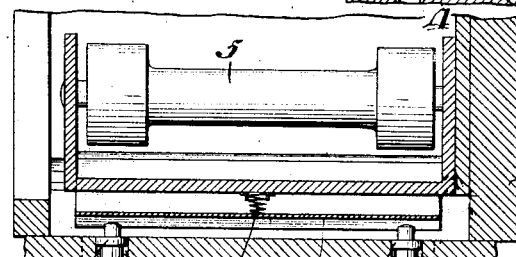

In the drawings, Figure 1 is a part sectional elevation representing the top of a camera or projecting machine in combination with coöperating parts of the film magazines fixed thereon; Fig. 2 is a sectional view taken through a corner of a film magazine having applied thereto improvements of my invention adapted for coöperation with means fixed upon a camera or projecting machine; Fig. 3 is a sectional view taken through a corner of a film magazine disposed in coöperative relation to the top of a camera or projecting machine; Fig. 4 is a sectional view taken on the line 4—4 of Fig. 3; Fig. 5 is a top plan view of a section of a camera or projecting machine having improvements of my invention applied thereto; Fig. 6 is a sectional view taken on the line 6—6 of Fig. 5; Fig. 7 is a perspective view of a section of the bottom of a film magazine having improvements of my invention applied thereto; and Fig. 8 is a broken sectional view taken on the line 8—8 of Fig. 5 with a film magazine thereon.

The mechanism, as illustrated in the drawings, comprises the camera or projecting machine 1 having fixed thereon the film magazines 2 containing the reels 3 which are respectively adapted for paying out and winding up the film 4; the film passing from one reel 3 over the roller 5 downwardly through the registering passage 6 of one magazine and passage 7 of the part 1, over the feeding sprocket 8 therein, back over this sprocket, and upwardly through a second registering passage 7 in the part 1 and passage 6 in a second magazine 2, over the corresponding roller 5 onto the other reel 3.

The top of the part 1 has fixed thereon a plate 8 provided with the parallel flanges 9 and 10 and the transversely extending dovetail cleat 11 disposed between the passages 7. Slides 12, parallel to the cleat 11 and on opposite sides of the passages 7, are movable through the flanges 9 and 10 and have therein longitudinal slots 13 through which pass guiding studs 14 fixed to the plate 8, the slides having dovetail wings 15 extending therefrom. These slides are reciprocated by handles comprising the crank levers 16 connected thereto by pivots 17, the levers being fulcrumed on the studs 18 fixed in the part 1.

Each magazine 2 is provided with a dovetail cleat 19 having the undercut wing 20 adapted for engaging the similarly undercut wing 21 of the cleat 11, the notch 22 adapted for passing a wing 15 of the slide 12 registering therewith, and the undercut wings 23 adapted for engaging the similar wings 15 on the slide 12, this cleat having the passage 6 cut therethrough. Each magazine is also provided with a second cleat disposed parallel to the cleat 19 and having a notch 25 and undercut wings 26, the notch 25 being adapted for passing one of the wings 15, and the wings 26 being adapted for engaging the wings 15.

It will be understood that magazines of this character are placed upon a kinetoscope 1, between the flanges 9 and 10 thereof, with the wings 20 in engagement with the wings 21 and the slides 12 retracted so that the wings 15 pass through the notches 22 and 25 into position for engaging the wings 23 and 26 and are clamped in position by operating the handles 16 to move the slides or bolts 12 so that the wings 15 engage the wings 23 and 26.

Each magazine is provided with a recess 6', forming a part of the passage 6, which contains an angular valve 27 adapted to be rocked on the hinge or bearing 28, this valve being normally pressed downwardly by the spring 29 for effecting the closure of the passage 6 and being movable upwardly against the action of the spring to open the passage 6 by the stud bolts 30 extending through the cleat 19, the bolts being provided with rings 30' which rest in the sockets 19' of the cleat 19. When the magazine is disengaged from the plate 8, the bolts 30 fall to the position shown in Fig. 2 and the spring 29, together with gravity, causes the valve 27 to close the passage 6 and prevent the admission of light to the interior of the magazine. When the magazine is fixed upon the plate 8, the bolts 30 register with the sockets 8' in the plate and are elevated, causing the opening of the valve 27 against the action of the spring 29 to permit the free movement of the film 4 through the passage 6, as illustrated in Fig. 4.

Having described my invention, I claim:

1. In a motion picture mechanism, the combination of a part having an undercut device thereon, a second undercut device movable thereon, and a passage, with a second part having an undercut device adapted for engaging said undercut device first named, a second undercut device adapted to be engaged by said movable undercut device, a passage registering with said passage first named, and means for passing a film through said passages.

2. In a motion picture mechanism, a part containing a film feeding device and a passage, a second part containing film carrying means and a passage registering with said passage first named, a valve for automatically closing the passage of said second named part, means for opening said valve when said second named part is joined to said first named part with said passages in registration, and means for fixing said parts together with said passages in registration.

3. In a motion picture mechanism, the combination of a kinetoscope containing a film passage and a film feeding mechanism, a film magazine containing film carrying mechanism and a film passage, said passages being adapted for registration, means for automatically closing the passage of said magazine when removed from said kinetoscope, a device for automatically opening said passage closing means when said magazine is fixed on said kinetoscope with said passages in registration, and means comprising a bolt for fixing said magazine on said kinetoscope.

4. In a motion picture mechanism, the combination of a kinetoscope containing a film passage and film feeding mechanism, a magazine containing a film passage and film carrying mechanism, an angular valve hinged to said magazine and adapted for closing the passage therein, a stud carried by said magazine and movable by engagement with said kinetoscope to open said valve when said magazine is fixed on said kinetoscope with said passages in registration, an undercut device fixed on said kinetoscope, an undercut device fixed to said magazine and adapted for engaging said first named undercut device when said passages are in registration, and an undercut slide carried by said kinetoscope and adapted for engaging said second named undercut device when said passages are in registration.

5. In a motion picture mechanism, the combination of a kinetoscope having fixed thereon a plate provided with a fixed undercut cleat and a movable undercut slide, with a magazine having fixed thereto undercut cleats adapted to be engaged by said slide, one of said cleats on said magazine engaging said cleat on said plate.

6. In a motion picture mechanism, a kinetoscope having fixed thereon a plate provided with a cleat of dovetail cross-section and slides having wings, in combination with a pair of magazines each provided with a cleat having an undercut section adapted to engage said cleat first named, said magazine cleats being provided with wings adapted to be engaged by respective wings of said slides.

7. In a motion picture mechanism, a kinetoscope having fixed thereon a plate provided with an undercut cleat and a slide provided with an undercut section, and a magazine provided with a cleat having a dovetail section adapted for engagement with said cleat and for engagement by said undercut slide, said second named cleat having a notch therein adapted for passing an undercut section of said slide.

8. In a motion picture mechanism, the combination of a kinetoscope having a film slot therein, with a magazine having a film slot therein adapted for registration with said first named film slot, an automatic valve normally closing said magazine slot, means for automatically opening said valve when said kinetoscope and magazine are juxtaposed, and means comprising a movable member fixed to one of said devices and adapted for engaging a part of the other for fixing said devices together.

In testimony whereof I have hereunto set my hand this 14th day of April, 1913, in the presence of the subscribing witnesses.

JULIEN TESSIER.

Witnesses:
CHARLES GOLDSMITH,
Jos. G. DENNY, Jr.